(12) United States Patent
Yazawa

(10) Patent No.: US 12,002,622 B2
(45) Date of Patent: Jun. 4, 2024

(54) METHOD FOR PRODUCING RESIN MOLD-TYPE ELECTRONIC COMPONENT AND RESIN MOLD-TYPE ELECTRONIC COMPONENT

(71) Applicant: TDK CORPORATION, Tokyo (JP)

(72) Inventor: Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 360 days.

(21) Appl. No.: 17/371,668

(22) Filed: Jul. 9, 2021

(65) Prior Publication Data

US 2022/0028610 A1 Jan. 27, 2022

(30) Foreign Application Priority Data

Jul. 22, 2020 (JP) ................................ 2020-125472

(51) Int. Cl.
*H01G 2/10* (2006.01)
*H01G 13/00* (2013.01)

(52) U.S. Cl.
CPC ........... *H01G 2/103* (2013.01); *H01G 13/003* (2013.01); *H01G 13/006* (2013.01)

(58) Field of Classification Search
CPC ............ H01G 4/30; H01G 4/232; H01G 4/38; H01G 4/228; H01G 4/224; H01G 2/10; H05K 1/181; H05K 2201/10015; H05K 2201/10431; H05K 3/301
USPC ...................................................... 361/679.1
See application file for complete search history.

(56) References Cited

U.S. PATENT DOCUMENTS

| 5,679,976 | A | 10/1997 | Nishikawa et al. | |
|---|---|---|---|---|
| 11,222,752 | B2 * | 1/2022 | Masuda | H01G 2/06 |
| 11,615,920 | B2 * | 3/2023 | Masuda | H01G 4/30 361/306.3 |
| 2015/0114697 | A1 * | 4/2015 | Murrell | H01L 23/49861 174/255 |
| 2017/0154731 | A1 * | 6/2017 | Tahara | H01G 4/232 |
| 2018/0182553 | A1 * | 6/2018 | Yazawa | H01G 4/224 |
| 2018/0374639 | A1 * | 12/2018 | Akiyoshi | H01G 4/12 |
| 2018/0374640 | A1 * | 12/2018 | Akiyoshi | H01G 4/30 |
| 2021/0125784 | A1 * | 4/2021 | Miyauchi | H01G 4/30 |

FOREIGN PATENT DOCUMENTS

| JP | S56-121238 U | 9/1981 |
|---|---|---|
| JP | S64-44092 A | 2/1989 |
| JP | H06-350233 A | 12/1994 |

(Continued)

OTHER PUBLICATIONS

English-language translation of Aug. 15, 2023 Office Action issued in Japanese Patent Application No. P2020-125472.

*Primary Examiner* — Mandeep S Buttar
(74) *Attorney, Agent, or Firm* — Oliff PLC

(57) ABSTRACT

A method for producing a resin mold-type electronic component in which an electronic component main body is covered with a mold resin includes preparing a first mold resin provided with a metal terminal, having an accommodating portion for the electronic component main body, and having a joining material filling space to be filled with a joining material, accommodating the electronic component main body in the accommodating portion of the first mold resin, and joining the metal terminal and a terminal electrode of the electronic component main body by filling the joining material filling space with the joining material.

5 Claims, 9 Drawing Sheets

(56) References Cited

FOREIGN PATENT DOCUMENTS

| | | |
|---|---|---|
| JP | H07-099131 A | 4/1995 |
| JP | H08-017686 A | 1/1996 |
| JP | 2001-332444 A | 11/2001 |
| JP | 2005-116943 A | 4/2005 |
| JP | 2008-034782 A | 2/2008 |
| JP | 2014-229867 A | 12/2014 |

* cited by examiner

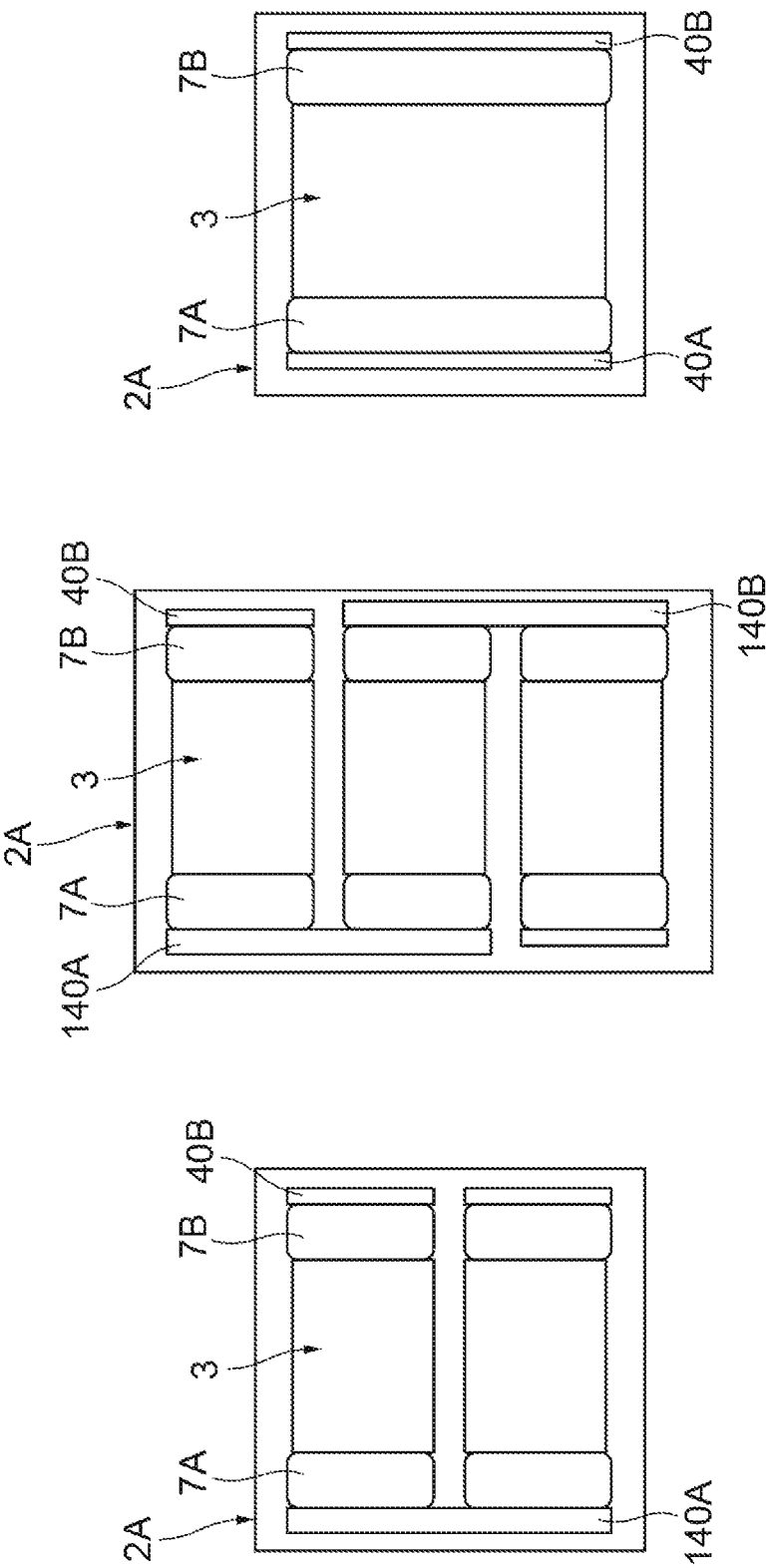

METHOD FOR PRODUCING RESIN MOLD-TYPE ELECTRONIC COMPONENT AND RESIN MOLD-TYPE ELECTRONIC COMPONENT

CROSS REFERENCE TO RELATED APPLICATIONS

This application claims priority to Japanese Patent Application No. 2020-125472 filed on Jul. 22, 2020, the entire contents of which are incorporated by reference herein.

TECHNICAL FIELD

The present disclosure relates to a method for producing a resin mold-type electronic component and a resin mold-type electronic component.

BACKGROUND

In the related art, the method that is described in Japanese Unexamined Patent Publication No. 2014-229867 is known as an electronic component producing method. In this producing method, a metal terminal is joined to a terminal electrode of an electronic component main body via a joining material. At this time, it is necessary to join the metal terminal to the terminal electrode of the electronic component main body in a predetermined posture and at a predetermined position.

SUMMARY

Here, it takes time and effort to perform alignment with accuracy between the terminal electrode of the electronic component main body and the metal terminal, and thus the metal terminal may be joined to the terminal electrode of the electronic component main body in a misaligned state. In a case where the electronic component main body is covered with a mold resin for moisture resistance improvement in this state, the terminal electrode of the electronic component main body and the metal terminal are covered with the mold resin in a misaligned state.

An object of the present disclosure is to provide a resin mold-type electronic component producing method and a resin mold-type electronic component capable of improving moisture resistance by mutually joining an electronic component main body and a metal terminal in a state where the misalignment thereof is reduced.

The method for producing a resin mold-type electronic component according to the present disclosure is a method for producing a resin mold-type electronic component in which an electronic component main body is covered with a mold resin. The method includes preparing a first mold resin provided with a metal terminal, having an accommodating portion for the electronic component main body, and having a joining material filling space to be filled with a joining material, accommodating the electronic component main body in the accommodating portion of the first mold resin, and joining the metal terminal and a terminal electrode of the electronic component main body by filling the joining material filling space with the joining material.

In the method for producing the resin mold-type electronic component according to the present disclosure, the first mold resin has the metal terminal and the accommodating portion for the electronic component main body in preparing the first mold resin. The first mold resin has the metal terminal and the accommodating portion at the same time as described above. Accordingly, in accommodating the electronic component main body in the accommodating portion, it is possible to easily and accurately perform alignment between the electronic component main body and the metal terminal simply by accommodating the electronic component main body in the accommodating portion. Here, the first mold resin has the joining material filling space to be filled with the joining material. Accordingly, in joining the metal terminal and the terminal electrode of the electronic component main body, it is possible to join the metal terminal and the terminal electrode while maintaining the positioned state simply by filling the joining material filling space with the joining material. In addition, the first mold resin is capable of improving the moisture resistance of the electronic component main body by covering the metal terminal, the joint portion, and the electronic component main body. From the above, it is possible to improve the moisture resistance by mutually joining the electronic component main body and the metal terminal in a state where the misalignment thereof is reduced.

The joining material may be poured in toward a mounting surface side with respect to the electronic component main body in joining the metal terminal and the terminal electrode of the electronic component main body. The joining material easily flows in toward the mounting surface, and thus it is possible to improve the certainty of joining between the metal terminal and the terminal electrode of the electronic component main body by pouring in the joining material to the part.

The joining material filling space may be formed between a main surface of the electronic component main body on the mounting surface side and a bottom surface of the first mold resin. The joining material easily flows in toward the bottom surface of the first mold resin, and thus the joining material is easily poured in by the joining material filling space being formed at the part. Accordingly, it is possible to improve the certainty of joining between the metal terminal and the terminal electrode of the electronic component main body.

A gap may be formed between the terminal electrode and the metal terminal and the joining material filling space may be filled with the joining material flowing via the gap in joining the metal terminal and the terminal electrode of the electronic component main body. By the gap being used in this manner, the joining material can be easily poured in from the upper side.

The metal terminal may have a vertical portion perpendicular to the mounting surface and the vertical portion may be exposed to the joining material filling space. In this case, the vertical portion functions as a wall portion blocking the joining material with which the joining material filling space is filled and the connectivity in relation to the joint portion is also ensured as it is. As a result, the filling with the joining material can be facilitated and the joinability between the metal terminal and the joint portion can be improved.

The method for producing a resin mold-type electronic component may further include a covering the electronic component main body exposed from the first mold resin with a second mold resin after joining the metal terminal and the terminal electrode of the electronic component main body. In this case, the entire electronic component main body can be covered with the mold resin, and thus a resin mold-type electronic component that has excellent moisture resistance can be produced.

The joining material may be low melting point solder. The filling with the joining material can be performed with the electronic component main body supported by the first mold resin, and thus a satisfactory connection is possible even in a case where low melting point solder is used.

The method for producing a resin mold-type electronic component according to the present disclosure is a method for producing a resin mold-type electronic component in which an electronic component main body is covered with a mold resin. The method includes covering the electronic component main body with a first mold resin provided with a metal terminal to be joined to a terminal electrode of the electronic component main body and covering the electronic component main body with a second mold resin.

In the method for producing a resin mold-type electronic component according to the present disclosure, the moisture resistance of the electronic component main body is improved by the electronic component main body being covered with the first mold resin and the second mold resin. In addition, the entire electronic component main body is not simultaneously covered with the mold resin and the process is divided between the first mold resin provided with the metal terminal and the second mold resin, that is, another mold resin. Accordingly, a producing method with a high degree of freedom is possible, and thus it becomes easy to execute a producing method by which the misalignment between the electronic component main body and the metal terminal is reduced. From the above, it is possible to improve the moisture resistance by mutually joining the electronic component main body and the metal terminal in a state where the misalignment thereof is reduced.

The resin mold-type electronic component according to the present disclosure includes an electronic component main body having a terminal electrode, a metal terminal joined to the terminal electrode via a joint portion, and a mold resin covering the electronic component main body and the joint portion and pulling a part of the metal terminal to the outside. The joint portion is disposed on a mounting surface side with respect to the electronic component main body in the mold resin and joins the metal terminal and the terminal electrode at the position.

In this resin mold-type electronic component, the mold resin is configured to pull a part of the metal terminal to the outside. During producing in this case, it is possible to easily and accurately perform alignment between the electronic component main body and the metal terminal simply by accommodating the electronic component main body in the mold resin. Here, the joint portion is disposed on the mounting surface side with respect to the electronic component main body in the mold resin and the metal terminal and the terminal electrode are joined by the joint portion at that position. In a case where the joint portion is disposed on the mounting surface side with respect to the electronic component as described above, it is possible to easily and accurately form the joining material filling space for filling with the joining material while positioning the metal terminal and the terminal electrode simply by disposing the electronic component main body in the mold resin. Accordingly, it is possible to join the metal terminal and the terminal electrode while maintaining the positioned state. In addition, the mold resin is capable of improving the moisture resistance of the electronic component main body by covering the metal terminal, the joint portion, and the electronic component main body. From the above, it is possible to improve the moisture resistance by mutually joining the electronic component main body and the metal terminal in a state where the misalignment thereof is reduced.

The mold resin may have a bottom surface facing a main surface of the electronic component main body on the mounting surface side, the bottom surface may have a recess portion separated from the main surface to the mounting surface side, and the joint portion may be disposed in the recess portion. In this case, it is possible to easily and accurately form the joining material filling space at the position of the recess portion simply by disposing the electronic component main body in the mold resin. In addition, the joining material easily flows in toward the bottom surface of the mold resin, and thus the joining material is easily poured in by the joining material filling space being formed at the part. Accordingly, the certainty of joining between the metal terminal and the terminal electrode of the electronic component main body can be improved.

The metal terminal may have a vertical portion perpendicular to the mounting surface and the joint portion may be connected to the vertical portion. In this case, the vertical portion functions as a wall portion blocking the joining material with which the joining material filling space is filled and the connectivity in relation to the joint portion is also ensured as it is. As a result, the filling with the joining material can be facilitated and the joinability between the metal terminal and the joint portion can be improved.

The joint portion may be connected to the terminal electrode at a part of the terminal electrode on the mounting surface side. The joining material easily flows in toward the mounting surface. Accordingly, it is possible to improve the certainty of joining between the metal terminal and the terminal electrode of the electronic component main body by pouring in the joining material to the part of the terminal electrode on the mounting surface side.

The electronic component main body may be sealed with the mold resin. In this case, a resin mold-type electronic component that has excellent moisture resistance can be provided.

A part of the electronic component main body on a side opposite to the mounting surface may be exposed from the mold resin. In this case, the state of the electronic component main body can be visually observed.

The metal terminal may extend, in a state of being perpendicular to the mounting surface, to the mounting surface side from the part where the metal terminal is joined to the terminal electrode via the joint portion. For example, in a case where the metal terminal extends from the joint portion in the direction that is parallel to the mounting surface, the mounting area of the resin mold-type electronic component increases. In contrast, by the metal terminal extending in a state of being perpendicular to the mounting surface to the mounting surface side from the part where the metal terminal is joined to the terminal electrode via the joint portion, the mounting area can be reduced and thus the mounting density can be improved.

The resin mold-type electronic component according to the present disclosure includes an electronic component main body having a terminal electrode, a metal terminal joined to the terminal electrode, and a mold resin covering the electronic component main body. The metal terminal extends from the terminal electrode toward a mounting surface and extends outward from the mold resin.

In the resin mold-type electronic component according to the present disclosure, the mold resin covers the electronic component main body. Accordingly, the moisture resistance of the electronic component main body can be improved. Here, the metal terminal extends from the terminal electrode toward the mounting surface and extend from the mold resin to the outside. As compared with, for example, a shape in which a metal terminal extends from the terminal electrode so as to be parallel to the mounting surface, the metal terminal is easily joined in a state where the misalignment in relation to the terminal electrode is reduced when the resin mold-type electronic component is produced. From the above, it is possible to improve the moisture resistance by mutually joining the electronic component main body and the metal terminal in a state where the misalignment thereof is reduced.

According to the present disclosure, it is possible to provide the resin mold-type electronic component producing method and the resin mold-type electronic component capable of improving the moisture resistance by mutually joining the electronic component main body and the metal terminal in a state where the misalignment thereof is reduced.

BRIEF DESCRIPTION OF THE DRAWINGS

FIGS. 9A, 9B, and 9C are plan views illustrating resin mold-type electronic components according to modification examples.

DETAILED DESCRIPTION

Figure 1:
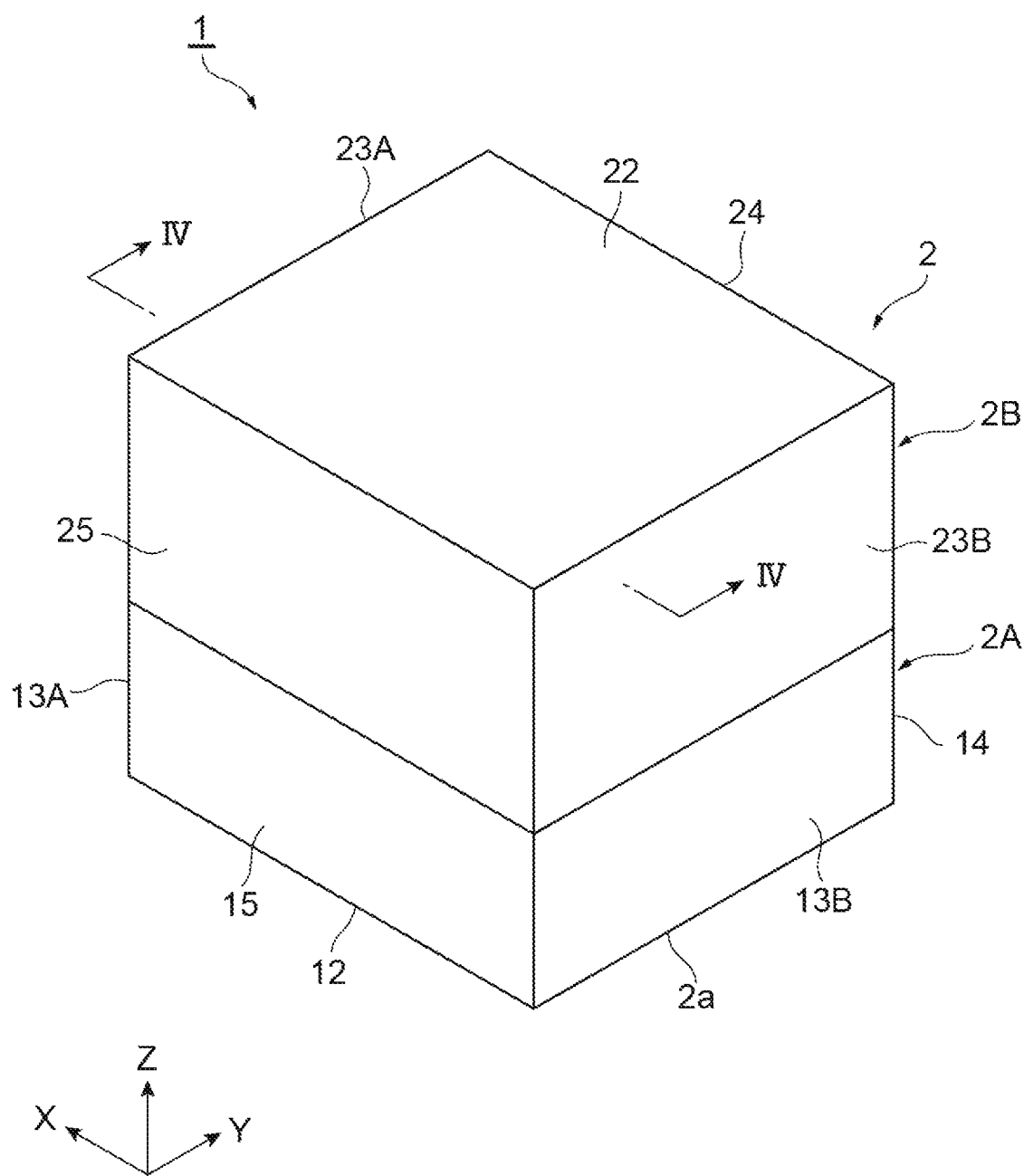
FIG. 1 is a perspective view of a resin mold-type electronic component according to an embodiment of the present disclosure.
Figure 2:
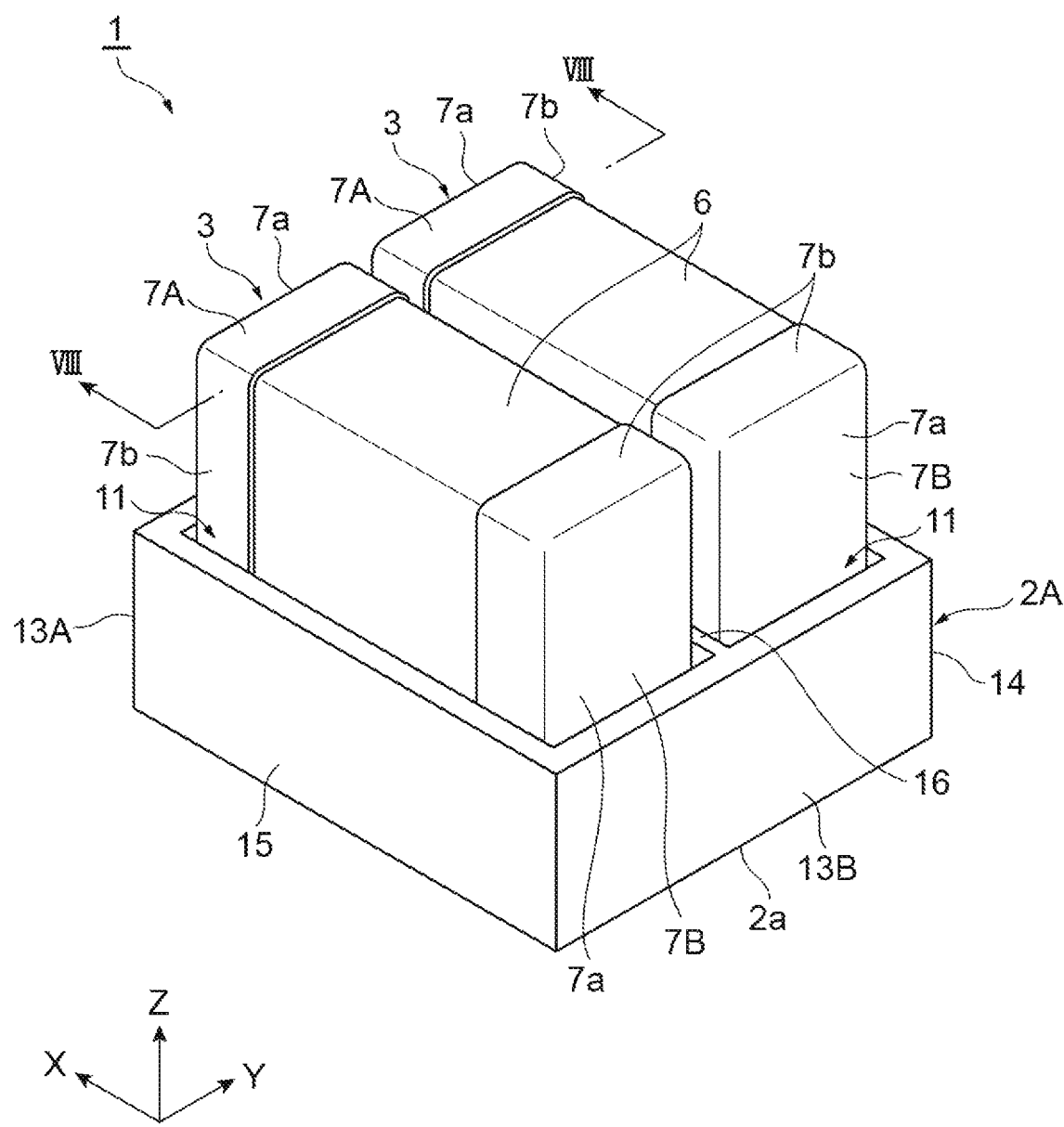
FIG. 2 is a perspective view of the resin mold-type electronic component in which a second mold resin is omitted.
Figure 3:
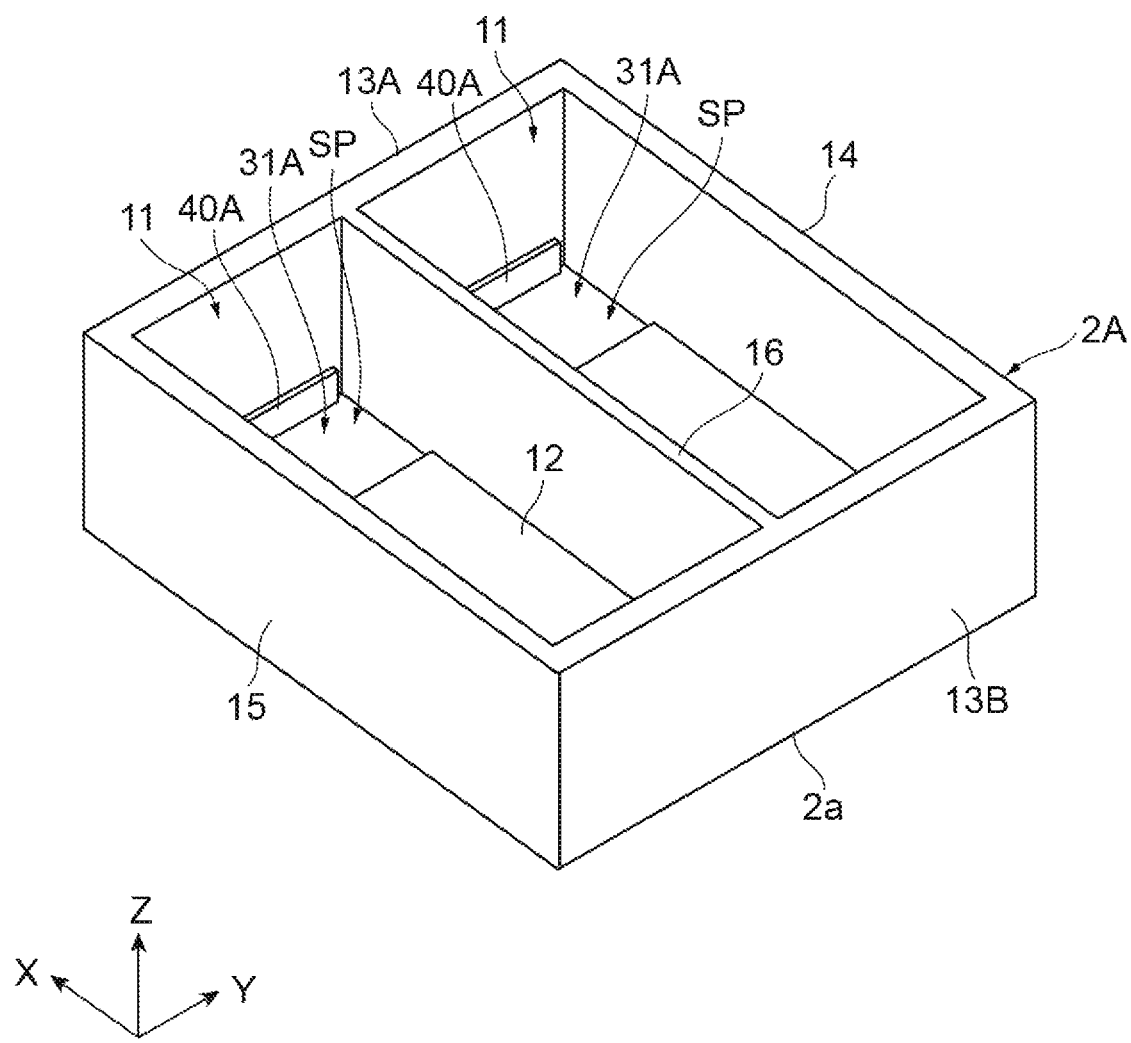
FIG. 3 is a perspective view of a first mold resin of the resin mold-type electronic component.
Figure 4:
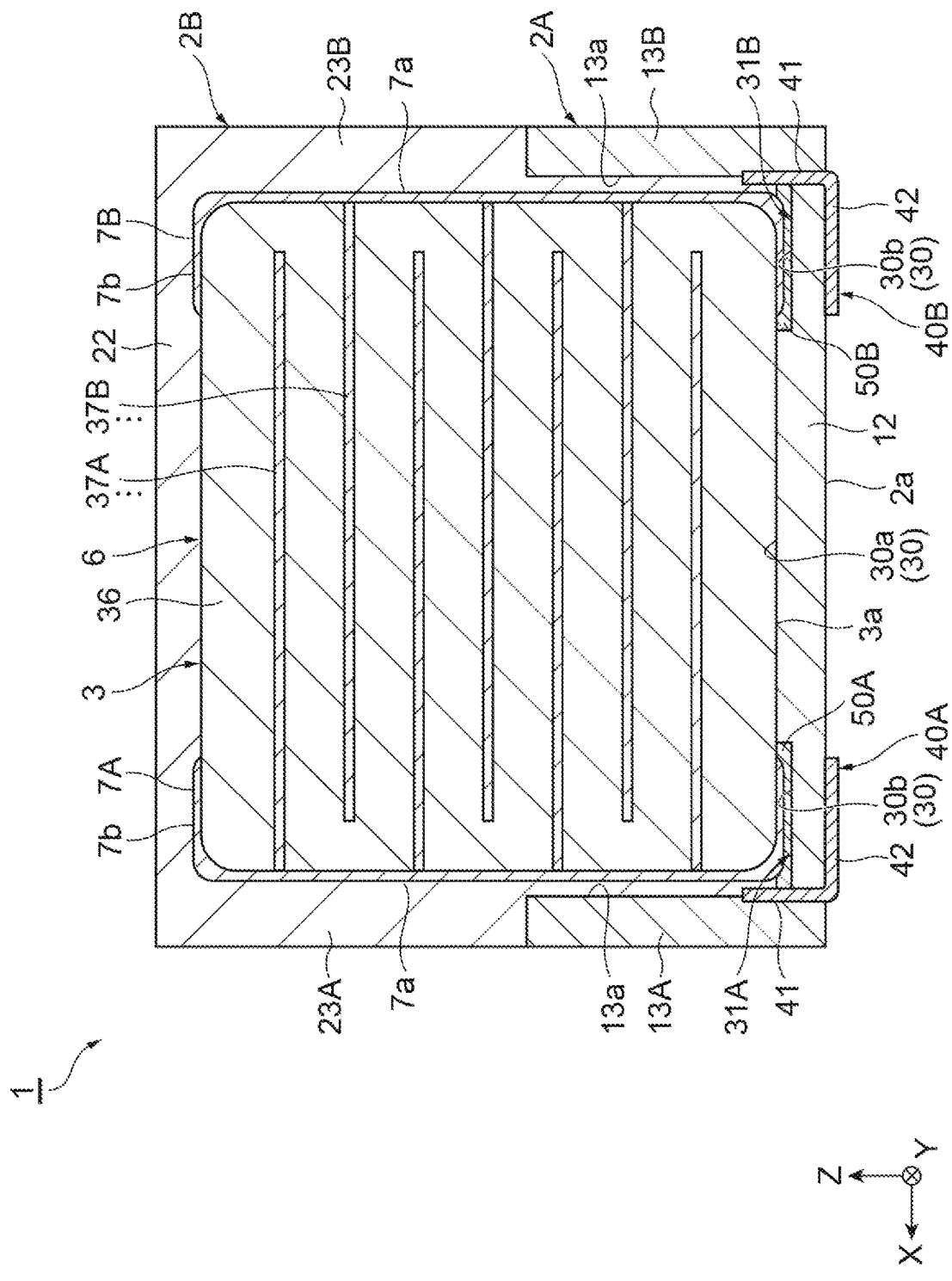
FIG. 4 is a cross-sectional view taken along line IV-IV illustrated in FIG. 1.

The structure of a resin mold-type electronic component 1 produced by a resin mold-type electronic component producing method according to an embodiment of the present disclosure will be described with reference to FIGS. 1 and 2. FIG. 1 is a perspective view of the resin mold-type electronic component 1. FIG. 2 is a perspective view of the resin mold-type electronic component 1 in which a second mold resin 2B is omitted. FIG. 3 is a perspective view of a first mold resin 2A of the resin mold-type electronic component 1. FIG. 4 is a cross-sectional view taken along line IV-IV illustrated in FIG. 1.

As illustrated in FIG. 1, the resin mold-type electronic component 1 is configured by a mold resin 2 covering an electronic component main body 3 (see FIG. 2). The mold resin 2 has a rectangular parallelepiped shape. In addition, the mold resin 2 has the first mold resin 2A and the second mold resin 2B. The first mold resin 2A is formed on the mounting surface 2a side mounted on a substrate, and the second mold resin 2B is formed on the side opposite to the mounting surface 2a. As illustrated in FIG. 2, the resin mold-type electronic component 1 includes two electronic component main bodies 3. It should be noted that the XYZ coordinates in the drawings may be used in the following description. The Y-axis direction is parallel to the direction in which the electronic component main bodies 3 are arranged, the Z axis coincides with the height direction from the mounting surface of the resin mold-type electronic component 1, and the X axis extends in the direction perpendicular to the Y-axis direction and the Z-axis direction. It should be noted that one side in the X-axis direction and the Y-axis direction is set to the positive side and the mounting surface 2a side in the Z-axis direction is set to the negative side.

As illustrated in FIG. 2, the electronic component main body 3 includes an element body 6 and a pair of terminal electrodes 7A and 7B. It should be noted that the two electronic component main bodies 3 have the same shape and size. The element body 6 has a substantially rectangular parallelepiped shape. The terminal electrode 7A is provided so as to cover the end surface of the element body 6 on the positive side in the X-axis direction. The terminal electrode 7B is provided so as to cover the end surface of the element body 6 on the negative side in the X-axis direction. In addition, the terminal electrodes 7A and 7B wrap around to the four side surfaces interconnecting the end surfaces of the element body 6 on both sides in the X-axis direction. Accordingly, the terminal electrodes 7A and 7B include main body portions 7a covering the end surfaces of the element body 6 in the X-axis direction and wrap-around portions 7b wrapping around to the four side surfaces.

In the present embodiment, the electronic component main body 3 is configured as a capacitor. Accordingly, as illustrated in FIG. 4, a plurality of internal electrode layers 37A and 37B are stacked across a dielectric layer 36 in the element body 6 and the internal electrode layer 37A connected to the terminal electrode 7A and the internal electrode layer 37B connected to the terminal electrode 7B are alternately stacked. The shape and size of the electronic component main body 3 may be appropriately determined depending on the purpose and application. For example, the electronic component main body 3 is approximately 1.0 to 10.0 mm in length (dimension in the X-axis direction), approximately 0.5 to 8.0 mm in width (dimension in the Z-axis direction), and approximately 0.3 to 5.0 mm in thickness (dimension in the Y-axis direction).

The material of the dielectric layer 36 of the electronic component main body 3 is not particularly limited. For example, the dielectric layer 36 of the electronic component main body 3 is made of a dielectric material such as calcium titanate, strontium titanate, barium titanate, or a mixture thereof. Although the conductor material contained in the internal electrode layers 37A and 37B is not particularly limited, a relatively inexpensive base metal can be used in a case where the constituent material of the dielectric layer 36 has reduction resistance. Ni or a Ni alloy is preferable as the base metal. An alloy of Ni and one or more elements selected from Mn, Cr, Co, and Al is preferable as the Ni alloy, and it is preferable that the alloy has a Ni content of 95 wt % or more. It should be noted that the Ni alloy or Ni may contain approximately 0.1 wt % or less of various trace components such as P. In addition, the internal electrode layers 37A and 37B may be formed by commercially available electrode paste being used. The thicknesses of the internal electrode layers 37A and 37B may be appropriately determined depending on the application and so on. The materials of the terminal electrodes 7A and 7B are not particularly limited, either. Although copper, a copper alloy, nickel, a nickel alloy, or the like is usually used, silver, a silver-palladium alloy, and so on can also be used. A metal coating of at least one selected from Ni, Cu, Sn, and so on may be formed on the surfaces of the terminal electrodes 7A and 7B.

Next, the first mold resin 2A will be described with reference to FIG. 3. As illustrated in FIG. 3, the first mold resin 2A has two accommodating portions 11 respectively accommodating the two electronic component main bodies 3. Specifically, the first mold resin 2A includes a bottom wall portion 12, side wall portions 13A and 13B facing each other in the X-axis direction, side wall portions 14 and 15 facing each other in the Y-axis direction, and a side wall portion 16 as a partition between the two accommodating portions 11. The accommodating portion 11 on the negative side in the Y-axis direction is configured by the bottom wall portion 12, the regions of the side wall portions 13A and 13B on the negative side in the Y-axis direction, the side wall portion 15, and the side wall portion 16. The accommodating portion 11 on the positive side in the Y-axis direction is configured by the bottom wall portion 12, the regions of the side wall portions 13A and 13B on the positive side in the Y-axis direction, the side wall portion 15, and the side wall portion 16. Each accommodating portion 11 is open in the end portion on the positive side in the Z-axis direction.

The side wall portions 13A and 13B rise from the bottom wall portion 12 to the positive side in the Z-axis direction so as to be parallel to the YZ plane. The side wall portion 13A is disposed in the end portion of the bottom wall portion 12 on the positive side in the X-axis direction. The side wall portion 13B is disposed in the end portion of the bottom wall portion 12 on the negative side in the X-axis direction. The side wall portions 14, 15, and 16 rise from the bottom wall portion 12 to the positive side in the Z-axis direction so as to be parallel to the XZ plane. The side wall portion 14 is disposed in the end portion of the bottom wall portion 12 on the positive side in the Y-axis direction. The side wall portion 15 is disposed in the end portion of the bottom wall portion 12 on the negative side in the Y-axis direction. The side wall portion 16 is disposed at the middle position of the bottom wall portion 12 in the Y-axis direction so as to be parallel to the side wall portions 14 and 15. The side wall portions 13A, 13B, 14, 15, and 16 have the same height in the Z-axis direction.

It should be noted that the second mold resin 2B has side wall portions 23A, 23B, 24, and 25 as illustrated in FIG. 1, the side wall portions 23A, 23B, 24, and 25 extend further to the positive side in the Z-axis direction than the side wall portions 13A, 13B, 14, and 15 of the first mold resin 2A, and the second mold resin 2B has an upper wall portion 22 covering the end portions of the two electronic component main bodies 3 on the positive side in the Z-axis direction. It should be noted that the second mold resin 2B also has a side wall portion extending further to the positive side in the Z-axis direction than the internal side wall portion 16.

For example, polyester, epoxy, and so on may be adopted as the materials of the first mold resin 2A and the second mold resin 2B. The material of the first mold resin 2A and the material of the second mold resin 2B may be identical or different. It should be noted that the boundary portion between the first mold resin 2A and the second mold resin 2B is illustrated in FIGS. 1 and 4 and yet the boundary portion between the first mold resin 2A and the second mold resin 2B may be invisible in a case where, for example, the same material is adopted.

The cross-sectional shape of the resin mold-type electronic component 1 will be described in detail with reference to FIG. 4. It should be noted that a cross section at the position of the electronic component main body 3 on the negative side in the Y-axis direction is illustrated in FIG. 4 and yet the configuration is similar at the position of the electronic component main body 3 on the positive side in the Y-axis direction.

As illustrated in FIG. 4, the first mold resin 2A has a bottom surface 30 facing a main surface 3a of the electronic component main body 3 on the mounting surface 2a side (that is, the negative side in the Z-axis direction). The main surface 3a is configured by the surfaces of the element body 6 and the terminal electrodes 7A and 7B of the electronic component main body on the negative side in the Z-axis direction. The bottom surface 30 has recess portions 31A and 31B separated from the main surface 3a to the mounting surface 2a side (that is, the negative side in the Z-axis direction). The recess portion 31A is formed at a position facing the terminal electrode 7A in the region of the bottom surface 30 near the end portion on the positive side in the X-axis direction. The recess portion 31B is formed at a position facing the terminal electrode 7B in the region of the bottom surface 30 near the end portion on the negative side in the X-axis direction. Bottom surfaces 30b of the recess portions 31A and 31B are disposed closer to the negative side in the Z-axis direction than a bottom surface 30a in the region that faces the element body 6. The bottom surface 30a is in contact with the element body 6 part of the main surface 3a and supports the electronic component main body 3. In this state, the bottom surfaces 30b of the recess portions 31A and 31B are separated from the terminal electrode 7A part and the terminal electrode 7B part of the main surface 3a in the Z-axis direction.

The first mold resin 2A is provided with metal terminals 40A and 40B. The metal terminals 40A and 40B are connected to the terminal electrodes 7A and 7B via joint portions 50A and 50B to be described later. The metal terminals 40A and 40B include vertical portions 41 and mounting portions 42. It should be noted that the metal terminals 40A and 40B extend over substantially the entire area of the accommodating portion 11 in the Y-axis direction (see FIG. 6).

The vertical portions 41 of the metal terminals 40A and 40B are parts perpendicular to the mounting surface 2a. The metal terminals 40A and 40B extend in parallel to the YZ plane and along side surfaces 13a inside the side wall portions 13A and 13B. The vertical portions 41 extend to the positive side in the Z-axis direction beyond the bottom surfaces 30b of the recess portions 31A and 31B. The vertical portions 41 extend to the positive side in the Z-axis direction beyond the bottom surface 30a (that is, the joint portions 50A and 50B to be described later). In addition, the vertical portions 41 extend to the negative side in the Z-axis direction beyond the bottom surfaces 30b of the recess portions 31A and 31B and extend to the mounting surface 2a. The vertical portions 41 constitute the outer side surfaces of the recess portions 31A and 31B in the X-axis direction. With such a configuration, the vertical portions 41 of the metal terminals 40A and 40B extend, in a state of being perpendicular to the mounting surface 2a, to the mounting surface 2a side from the parts where the metal terminals 40A and 40B are joined to the terminal electrodes 7A and 7B via the joint portions 50A and 50B. The vertical portion 41 extends linearly from the upper end in the Z-axis direction to the lower end in the Z-axis direction and does not have a bent part in the middle.

The mounting portions 42 of the metal terminals 40A and 40B are the parts of the mounting surface 2a that are exposed to the outside from the first mold resin 2A and mounted on a substrate. The mounting portions 42 extend inward in the X-axis direction from the lower ends of the vertical portions 41. The mounting portions 42 extend on the mounting surface 2a so as to be parallel to the mounting surface 2a, that is, the XY plane.

The material of the metal terminals 40A and 40B is not particularly limited insofar as it is a conductive metal material. For example, iron, nickel, copper, silver, and so on can be used. Alternatively, alloys containing these can be used. It is particularly preferable that the metal terminals 40A and 40B are made of phosphor bronze from the viewpoint of suppressing the specific resistance of the metal terminals 40A and 40B and reducing the ESR of the capacitor.

The joint portions 50A and 50B are formed in the recess portions 31A and 31B of the bottom surface 30 of the first mold resin 2A. The joint portions 50A and 50B are formed by the recess portions 31A and 31B being filled with a joining material such as solder. As a result, the joint portions 50A and 50B are disposed on the mounting surface 2a side of the electronic component main body 3 (that is, the negative side in the Z-axis direction). In other words, the joint portions 50A and 50B are disposed between the bottom surfaces 30b of the recess portions 31A and 31B and the parts of the main surface 3a corresponding to the terminal electrodes 7A and 7B. The joint portions 50A and 50B are connected to the vertical portions 41 of the metal terminals 40A and 40B. In addition, the joint portions 50A and 50B are connected to the mounting surface 2a side parts of the terminal electrodes 7A and 7B, that is, the wrap-around portions 7b of the terminal electrodes 7A and 7B on the negative side in the Z-axis direction. As a result, the terminal electrodes 7A and 7B and the metal terminals 40A and 40B are joined via the joint portions 50A and 50B, respectively.

Figure 5:
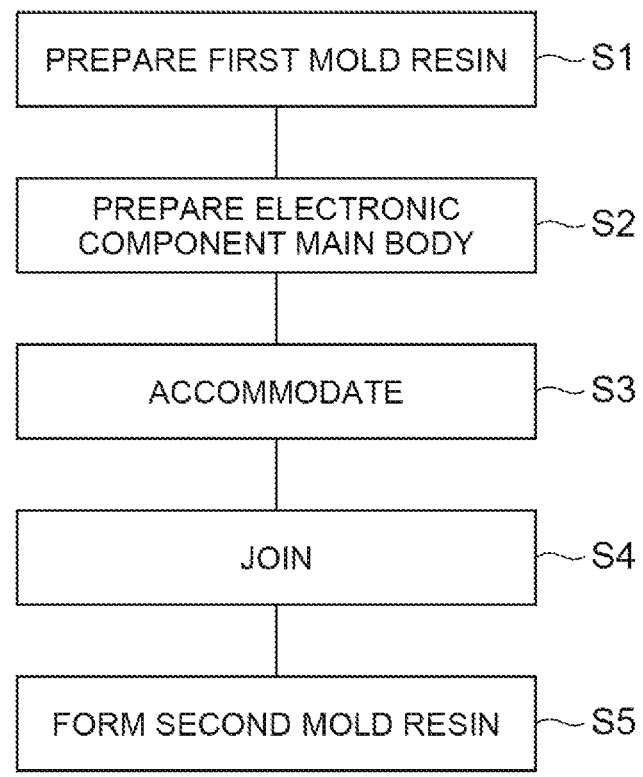
FIG. 5 is a process diagram of a resin mold-type electronic component producing method according to an embodiment of the present disclosure.

Next, the resin mold-type electronic component producing method according to the embodiment of the present disclosure will be described with reference to FIG. 5. FIG. 5 is a process diagram of the resin mold-type electronic component producing method according to the embodiment of the present disclosure.

As illustrated in FIG. 5, Step S1 of preparing the first mold resin 2A provided with the metal terminals 40A and 40B, having the accommodating portions 11 for the electronic component main bodies 3, and having a joining material filling space SP to be filled with a joining material is executed. The first mold resin 2A that is in the state illustrated in FIG. 3 is prepared in Step S1. The first mold resin 2A is provided with the metal terminals 40A and 40B with respect to the respective accommodating portions 11. The metal terminals 40A and 40B are integrally molded when the first mold resin 2A is molded. In this state, the joining material filling space SP is open toward the positive side in the Z-axis direction at the positions of the recess portions 31A and 31B.

Figure 6:
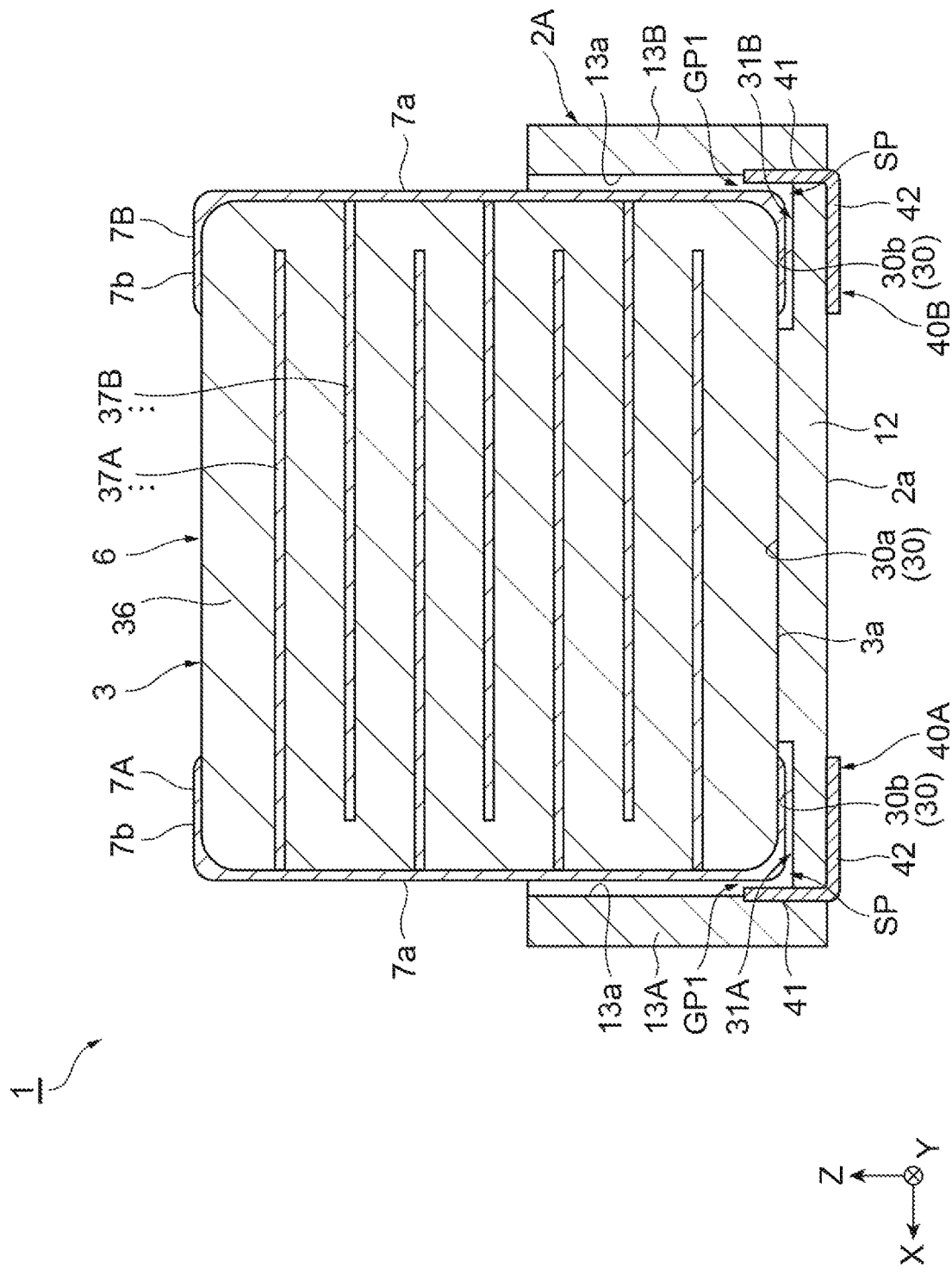
FIG. 6 is a cross-sectional view illustrating a state where an electronic component main body is accommodated in the first mold resin.

Next, Step S2 of preparing the electronic component main body 3 is executed (see FIG. 5). Next, Step S3 of accommodating the electronic component main body 3 in the accommodating portion 11 of the first mold resin 2A is executed (see FIG. 5). As illustrated in FIG. 6, the first mold resin 2A is disposed such that the bottom wall portion 12 side is disposed on the lower side and the accommodating portion 11 opens upward. It should be noted that FIG. 6 is a cross-sectional view at the part that corresponds to FIG. 4. Then, the electronic component main body 3 is inserted from above into the accommodating portion 11. At this time, the main surface 3a of the electronic component main body 3 on the element body 6 is placed on the bottom surface 30a of the bottom wall portion 12. In addition, the terminal electrodes 7A and 7B are separated from the bottom surfaces 30b of the recess portions 31A and 31B. At this time, the joining material filling spaces SP are formed between the main surface 3a of the electronic component main body 3 on the mounting surface 2a side and the bottom surfaces 30b of the first mold resin 2A. In addition, the vertical portions 41 of the metal terminals 40A and 40B are exposed to the joining material filling spaces SP.

Figure 7:
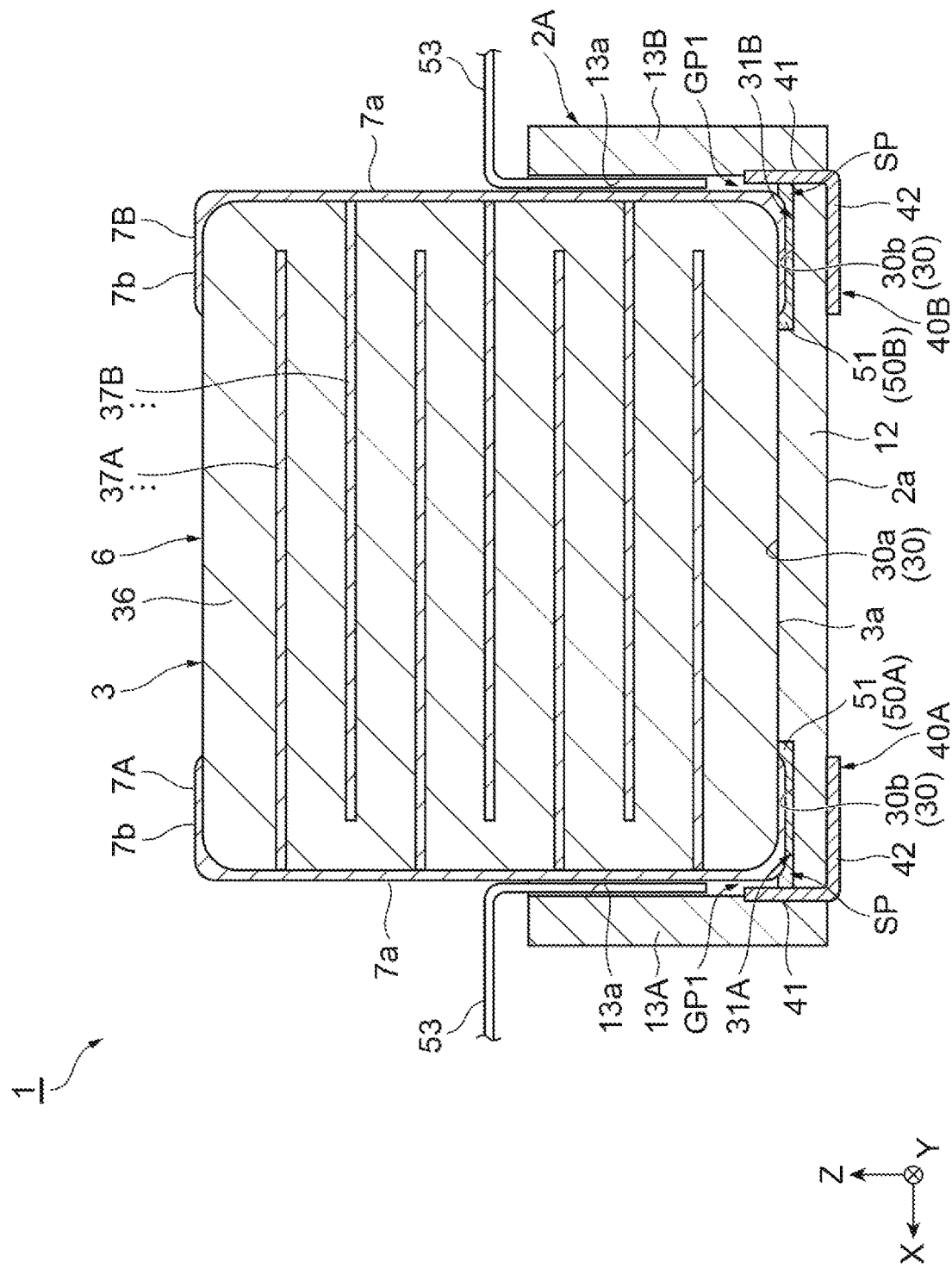
FIG. 7 is a cross-sectional view illustrating a state where a joining material filling space is filled with a joining material.
Figure 8:
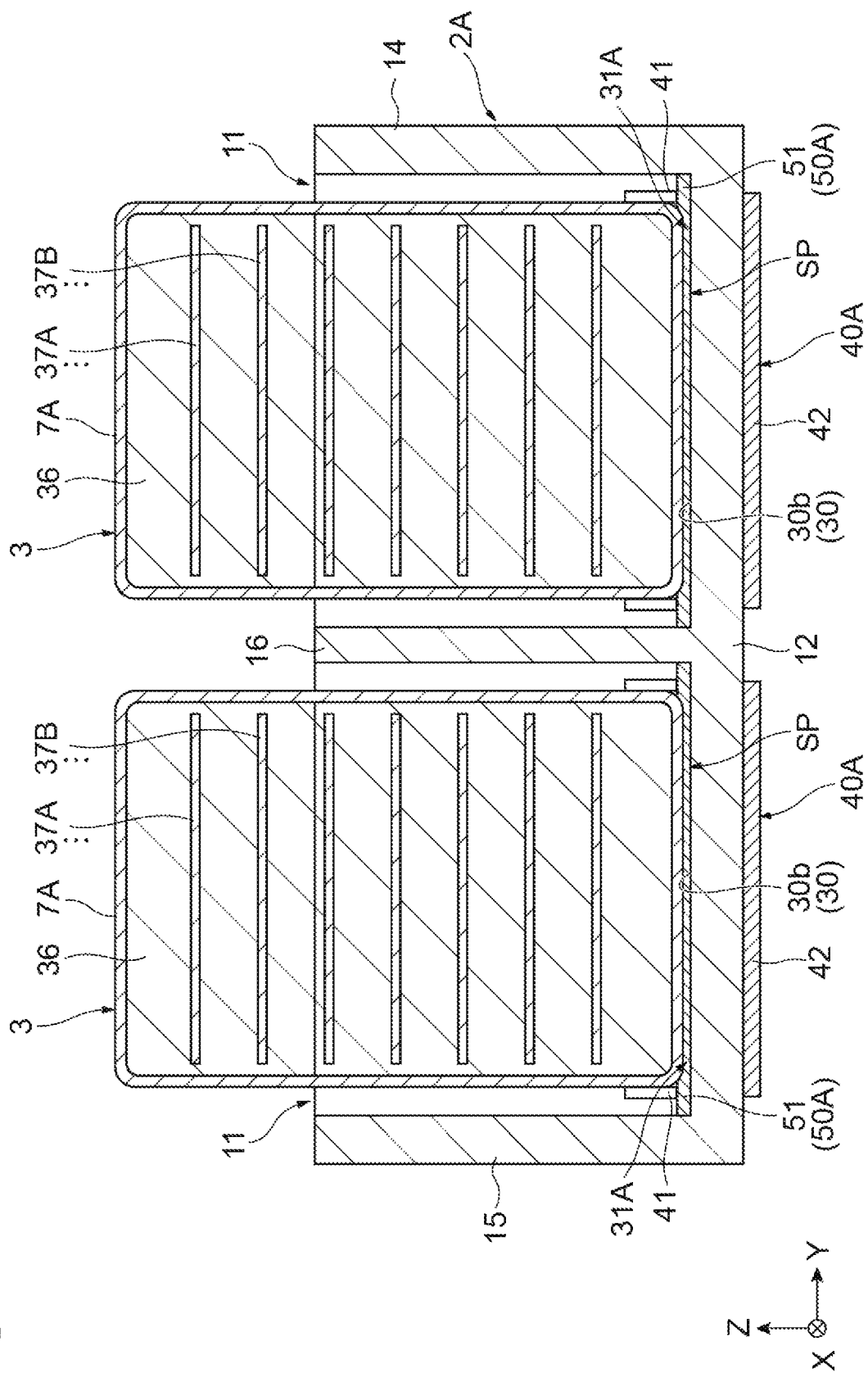
FIG. 8 is a cross-sectional view taken along line VIII-VIII illustrated in FIG. 2.

Next, Step S4 of joining the metal terminals 40A and 40B and the terminal electrodes 7A and 7B of the electronic component main body 3 to each other by filling the joining material filling spaces SP with the joining material is executed (see FIG. 5). In Step S4, the joining material is poured in toward the mounting surface 2a with respect to the electronic component main body 3. Specifically, as illustrated in FIG. 7, gaps are formed between the terminal electrodes 7A and 7B and the vertical portions 41 of the metal terminals 40A and 40B. A joining material 51 is poured in via gaps GP1 and the joining material filling spaces SP are filled with the joining material 51. Here, nozzles 53 are inserted into the gaps between the side wall portions 13A and 13B and the electronic component main body 3. Then, the joining material 51 is poured in from the nozzles 53 via the gaps GP1 and the joining material filling spaces SP are filled with the joining material 51. At this time, the joining material 51 flows in between the bottom surfaces 30b of the recess portions 31A and 31B and the wrap-around portions 7b of the terminal electrodes 7A and 7B and comes into contact with the bottom surfaces 30b and the wrap-around portions 7b. In addition, the joining material 51 is blocked by the vertical portions 41 of the metal terminals 40A and 40B and comes into contact with the vertical portions 41. After the joining material filling spaces SP are completely filled with the joining material 51, the joining material 51 is cured and the joint portions 50A and 50B are formed. It should be noted that gaps are also formed between the side wall portions 14 and 15 and the electronic component main bodies 3 as illustrated in FIG. 8 and thus the nozzles 53 may be inserted from the gaps.

Next, Step S5 of covering the electronic component main body 3 exposed from the first mold resin 2A with the second mold resin 2B is executed (see FIG. 5). In Step S5, the second mold resin 2B is molded by the component that is in the state illustrated in FIG. 2 being disposed in a mold. After the second mold resin 2B is formed, the resin mold-type electronic component 1 is taken out of the mold. As a result, the process illustrated in FIG. 5 is completed.

Next, the actions and effects of the resin mold-type electronic component 1 and the method for producing the resin mold-type electronic component 1 according to the present embodiment will be described.

The method for producing the resin mold-type electronic component 1 according to the present embodiment is a method for producing the resin mold-type electronic component 1 in which the electronic component main body 3 is covered with the mold resin 2. The method includes Step S1 of preparing the first mold resin 2A provided with the metal terminals 40A and 40B, having the accommodating portions 11 for the electronic component main bodies 3, and having the joining material filling space SP to be filled with the joining material 51, Step S3 of accommodating the electronic component main body 3 in the accommodating portion 11 of the first mold resin 2A, and Step S4 of joining the metal terminals 40A and 40B and the terminal electrodes 7A and 7B of the electronic component main body 3 to each other by filling the joining material filling space SP with the joining material 51.

In the method for producing the resin mold-type electronic component 1 according to the present embodiment, the first mold resin 2A has the metal terminals 40A and 40B and the accommodating portion 11 for the electronic component main body 3 in Step S1 of preparing the first mold resin 2A. The first mold resin 2A has the metal terminals 40A and 40B and the accommodating portion 11 at the same time as described above. Accordingly, in Step S3 of accommodating the electronic component main body 3 in the accommodating portion 11, it is possible to easily and accurately perform alignment between the electronic component main body 3 and the metal terminals 40A and 40B simply by accommodating the electronic component main body 3 in the accommodating portion 11. Here, the first mold resin 2A has the joining material filling space SP to be filled with the joining material 51. Accordingly, in Step S4 of joining the metal terminals 40A and 40B and the terminal electrodes 7A and 7B of the electronic component main body 3, it is possible to join the metal terminals 40A and 40B and the terminal electrodes 7A and 7B while maintaining the positioned state simply by filling the joining material filling space SP with the joining material 51. In addition, the first mold resin 2A is capable of improving the moisture resistance of the electronic component main body 3 by covering the metal terminals 40A and 40B, the joint portions 50A and 50B, and the electronic component main body 3. From the above, it is possible to improve the moisture resistance by mutually joining the electronic component main body 3 and the metal terminals 40A and 40B in a state where the misalignment thereof is reduced.

In Step S4 of joining the metal terminals 40A and 40B and the terminal electrodes 7A and 7B of the electronic component main body 3, the joining material 51 may be poured in toward the mounting surface 2a with respect to the electronic component main body 3. For example, in a case where joint portions are provided on the lateral sides of the main body portions 7a of the terminal electrodes 7A and 7B, the joining material 51 may flow downward and a decline in connectivity may arise. In contrast, since the joining material 51 easily flows in toward the mounting surface 2a, it is possible to improve the certainty of joining between the metal terminals 40A and 40B and the terminal electrodes 7A and 7B of the electronic component main body 3 by pouring in the joining material 51 to the part.

The joining material filling space SP may be formed between the main surface 3a of the electronic component main body 3 on the mounting surface 2a side and the bottom surface 30b of the first mold resin 2A. Since the joining material 51 easily flows in toward the bottom surface 30b of the first mold resin 2A, the joining material 51 is easily poured in by the joining material filling space SP being formed at the part. Accordingly, it is possible to improve the certainty of joining between the metal terminals 40A and 40B and the terminal electrodes 7A and 7B of the electronic component main body 3.

In Step S4 of joining the metal terminals 40A and 40B and the terminal electrodes 7A and 7B of the electronic component main body 3, the gaps GP1 are formed between the terminal electrodes 7A and 7B and the metal terminals 40A and 40B and the joining material filling spaces SP may be filled with the joining material 51 flowing via the gaps GP1. By the gap GP1 being used in this manner, the joining material 51 can be easily poured in from the upper side.

The metal terminals 40A and 40B have the vertical portions 41 perpendicular to the mounting surface 2a, and the vertical portions 41 may be exposed to the joining material filling spaces SP. In this case, the vertical portions 41 function as wall portions blocking the joining material 51 with which the joining material filling spaces SP are filled and the connectivity in relation to the joint portions 50A and 50B is also ensured as it is. As a result, the filling with the joining material 51 can be facilitated and the joinability between the metal terminals 40A and 40B and the joint portions 50A and 50B can be improved.

The method for producing the resin mold-type electronic component 1 may further include covering the electronic component main body 3 exposed from the first mold resin 2A with the second mold resin 2B after Step S4 of joining the metal terminals 40A and 40B and the terminal electrodes 7A and 7B of the electronic component main body 3. In this case, the entire electronic component main body 3 can be covered with the mold resin 2, and thus the resin mold-type electronic component 1 that has excellent moisture resistance can be produced.

The joining material 51 may be low melting point solder. The filling with the joining material 51 can be performed with the electronic component main body 3 supported by the first mold resin 2A, and thus a satisfactory connection is possible even in a case where low melting point solder is used.

The method for producing the resin mold-type electronic component 1 according to the present embodiment is a method for producing the resin mold-type electronic component 1 in which the electronic component main body 3 is covered with the mold resin 2. The method includes Step S3 of covering the electronic component main body 3 with the first mold resin 2A provided with the metal terminals 40A and 40B to be joined to the terminal electrodes 7A and 7B of the electronic component main body 3 and Step S5 of covering the electronic component main body 3 with the second mold resin 2B.

In the method for producing the resin mold-type electronic component 1 according to the present embodiment, the moisture resistance of the electronic component main body 3 is improved by the electronic component main body 3 being covered with the first mold resin 2A and the second mold resin 2B. In addition, the entire electronic component main body 3 is not simultaneously covered with the mold resin 2 and the process is divided between the first mold resin 2A provided with the metal terminals 40A and 40B and the second mold resin 2B, that is, another mold resin. Accordingly, a producing method with a high degree of freedom is possible, and thus it becomes easy to execute a producing method by which the misalignment between the electronic component main body 3 and the metal terminals 40A and 40B is reduced. From the above, it is possible to improve the moisture resistance by mutually joining the electronic component main body 3 and the metal terminals 40A and 40B in a state where the misalignment thereof is reduced.

The resin mold-type electronic component 1 according to the present embodiment includes the electronic component main body 3 having the terminal electrodes 7A and 7B, the metal terminals 40A and 40B joined to the terminal electrodes 7A and 7B via the joint portions 50A and 50B, and the mold resin 2 covering the electronic component main body 3 and the joint portions 50A and 50B and pulling the metal terminals 40A and 40B to the outside in part. The joint portions 50A and 50B are disposed on the mounting surface 2a side with respect to the electronic component main body 3 in the mold resin 2. At that position, the metal terminals 40A and 40B and the terminal electrodes 7A and 7B are joined by the joint portions 50A and 50B.

In this resin mold-type electronic component 1, the mold resin 2 is configured to pull the metal terminals 40A and 40B to the outside in part. During producing in this case, it is possible to easily and accurately perform alignment between the electronic component main body 3 and the metal terminals 40A and 40B simply by accommodating the electronic component main body 3 in the mold resin 2. Here, in a case where joint portions are formed between, for example, the main body portions 7a of the terminal electrodes 7A and 7B and the vertical portions 41 of the metal terminals 40A and 40B, alignment needs to be carefully performed such that joining material filling spaces are formed between the main body portions 7a of the terminal electrodes 7A and 7B and the vertical portions 41 of the metal terminals 40A and 40B. In contrast, the joint portions 50A and 50B in the present embodiment are disposed on the mounting surface 2a side with respect to the electronic component main body 3 in the mold resin 2 and the metal terminals 40A and 40B and the terminal electrodes 7A and 7B are joined by the joint portions 50A and 50B at that position. In a case where the joint portions 50A and 50B are disposed on the mounting surface 2a side with respect to the electronic component main body 3 as described above, it is possible to easily and accurately form the joining material filling space for filling with the joining material 51 while positioning the metal terminals 40A and 40B and the terminal electrodes 7A and 7B simply by disposing the electronic component main body 3 in the mold resin 2 (here, simply by placing the electronic component main body 3 on the bottom surface 30a). Accordingly, it is possible to join the metal terminals 40A and 40B and the terminal electrodes 7A and 7B while maintaining the positioned state. In addition, the mold resin 2 is capable of improving the moisture resistance of the electronic component main body 3 by covering the metal terminals 40A and 40B, the joint portions 50A and 50B, and the electronic component main body 3. From the above, it is possible to improve the moisture resistance by mutually joining the electronic component main body 3 and the metal terminals 40A and 40B in a state where the misalignment thereof is reduced.

The mold resin 2 has the bottom surface 30 facing the main surface 3a of the electronic component main body 3 on the mounting surface 2a side, the bottom surface 30 has the recess portions 31A and 31B separated from the main surface 3a to the mounting surface 2a side, and the joint portions 50A and 50B may be disposed in the recess portions 31A and 31B. In this case, it is possible to easily and accurately form the joining material filling spaces SP at the positions of the recess portions 31A and 31B simply by disposing the electronic component main body 3 in the mold resin 2. In addition, the joining material 51 easily flows in toward the bottom surface 30 of the mold resin 2, and thus the joining material 51 is easily poured in by the joining material filling space SP being formed at the part. Accordingly, the certainty of joining between the metal terminals 40A and 40B and the terminal electrodes 7A and 7B of the electronic component main body 3 can be improved.

The metal terminals 40A and 40B have the vertical portions 41 perpendicular to the mounting surface 2a, and the joint portions 50A and 50B may be connected to the vertical portions 41. In this case, the vertical portions 41 function as wall portions blocking the joining material 51 with which the joining material filling spaces SP are filled and the connectivity in relation to the joint portions 50A and 50B is also ensured as it is. As a result, the filling with the joining material 51 can be facilitated and the joinability between the metal terminals 40A and 40B and the joint portions 50A and 50B can be improved.

The joint portions 50A and 50B may be connected to the terminal electrodes 7A and 7B at the parts of the terminal electrodes 7A and 7B on the mounting surface side. The joining material easily flows in toward the mounting surface. Accordingly, it is possible to improve the certainty of joining between the metal terminals 40A and 40B and the terminal electrodes 7A and 7B of the electronic component main body by pouring in the joining material to the parts of the terminal electrodes 7A and 7B on the mounting surface side.

The electronic component main body 3 may be sealed with the mold resin 2. In this case, the resin mold-type electronic component 1 that has excellent moisture resistance can be provided.

The metal terminals 40A and 40B may extend, in a state of being perpendicular to the mounting surface, to the mounting surface side from the parts where the metal terminals 40A and 40B are joined to the terminal electrodes 7A and 7B via the joint portions 50A and 50B. For example, in a case where the metal terminals 40A and 40B extend from the joint portions 50A and 50B in the direction that is parallel to the mounting surface, the mounting area of the resin mold-type electronic component increases. In contrast, by the metal terminals 40A and 40B extending in a state of being perpendicular to the mounting surface 2a to the mounting surface 2a side from the parts where the metal terminals 40A and 40B are joined to the terminal electrodes 7A and 7B via the joint portions 50A and 50B, the mounting area can be reduced and thus the mounting density can be improved.

The resin mold-type electronic component 1 according to the present embodiment includes the electronic component main body 3 having the terminal electrodes 7A and 7B, the metal terminals 40A and 40B joined to the terminal electrodes 7A and 7B, and the mold resin 2 covering the electronic component main body 3. The metal terminals 40A and 40B extend from the terminal electrodes 7A and 7B toward the mounting surface 2a and extend from the mold resin 2 to the outside.

In the resin mold-type electronic component 1 according to the present embodiment, the mold resin 2 covers the electronic component main body 3. Accordingly, the moisture resistance of the electronic component main body 3 can be improved. Here, the metal terminals 40A and 40B extend from the terminal electrodes 7A and 7B toward the mounting surface 2a and extend from the mold resin 2 to the outside. As compared with, for example, a shape in which metal terminals extend from the terminal electrodes 7A and 7B so as to be parallel to the mounting surface 2a, the metal terminals 40A and 40B are easily joined in a state where the misalignment in relation to the terminal electrodes 7A and 7B is reduced when the resin mold-type electronic component 1 is produced. From the above, it is possible to improve the moisture resistance by mutually joining the electronic component main body 3 and the metal terminals 40A and 40B in a state where the misalignment thereof is reduced.

The present disclosure is not limited to the embodiment described above.

For example, although a structure in which the two electronic component main bodies 3 are arranged in parallel has been exemplified in the embodiment described above, the number and connection mode of the electronic component main bodies 3 are not particularly limited. For example, as illustrated in FIG. 9A, the two electronic component main bodies 3 may be connected in series by a metal terminal 140A interconnecting the terminal electrodes 7A and 7A of the two electronic component main bodies 3. In addition, as illustrated in FIG. 9B, three electronic component main bodies 3 may be connected in series by a metal terminal 140B interconnecting the terminal electrodes 7B and 7B. In addition, three or more electronic component main bodies 3 may be connected in parallel. In addition, the electronic component main body 3 may be placed flat as illustrated in FIG. 9C.

In the resin mold-type electronic component 1, the part of the electronic component main body on the side opposite to the mounting surface 2a may be exposed from the first mold resin 2A (see FIG. 2). In this case, the state of the electronic component main body 3 can be visually observed.

The nozzle 53 used during the filling with the joining material 51 does not necessarily have to be inserted into the gap from the upper side. For example, a hole or the like may be formed in the side wall portion of the first mold resin and the nozzle may be inserted into the hole.

Although the joint portion is disposed on the mounting surface 2a side with respect to the electronic component main body 3 in the embodiment described above, the position of the joint portion is not particularly limited. For example, joint portions may be formed on the lateral sides of the main body portions 7a of the terminal electrodes 7A and 7B. In addition, although the joining material filling spaces SP are formed by the recess portions 31A and 31B being formed in the bottom surface 30 in the embodiment described above, the structure for forming the joining material filling space SP is not particularly limited.

It should be noted that the electronic component main body 3 is not limited to a capacitor and the present disclosure can be applied to any electronic component insofar as a metal terminal can be attached to a terminal electrode. In addition, the configuration of the metal terminal is also not limited to that of the embodiment described above. In other words, the configuration of the metal terminal can be appropriately changed insofar as it has a shape allowing it to be joined to a terminal electrode via a connecting portion.

REFERENCE SIGNS LIST

1: resin mold-type electronic component, 2: mold resin, 2a: mounting surface, 2A: first mold resin, 2B: second mold resin, 3: electronic component main body, 3a: main surface, 7A, 7B: terminal electrode, 11: accommodating portion, 40A, 40B: metal terminal, 50A, 50B: joint portion, 51: joining material.

What is claimed is:

1. A resin mold-type electronic component comprising:
   an electronic component main body having a terminal electrode, the terminal electrode being one of a pair of electrodes facing each other in a first direction;
   a metal terminal joined to the terminal electrode via a joint portion; and
   a mold resin covering the electronic component main body and the joint portion, the mold resin having an outer surface constitute a mounting surface, the mounting surface being parallel to the first direction,
   wherein the joint portion is disposed at a position on a mounting surface side in the mold resin and joins the metal terminal and the terminal electrode at the position,
   the mold resin has a bottom surface facing a main surface of the electronic component main body on the mounting surface side,
   the bottom surface has a recess portion separated from the main surface to the mounting surface side and at least a portion of the joint portion is disposed in the recess portion,
   the metal terminal has a vertical portion perpendicular to the mounting surface and the joint portion is directly connected to the vertical portion, and
   a part of the vertical portion is pulled out from the mounting surface in a direction perpendicular to the first direction.

2. The resin mold-type electronic component according to claim 1, wherein the joint portion is connected to the terminal electrode at a part of the terminal electrode on the mounting surface side.

3. The resin mold-type electronic component according to claim 1, wherein the electronic component main body is sealed with the mold resin.

4. The resin mold-type electronic component according to claim 1, wherein a part of the electronic component main body on a side opposite to a mounting surface is exposed from the mold resin.

5. The resin mold-type electronic component according to claim 1, wherein the metal terminal extends, in a state of being perpendicular to the mounting surface, to the mounting surface side from the position where the metal terminal is joined to the terminal electrode via the joint portion.

* * * * *